United States Patent [19]
Dodd

[11] 3,951,805
[45] Apr. 20, 1976

[54] ALGAE HARVESTER

[76] Inventor: Joseph C. Dodd, 117 Powell Drive, Werribee, Victoria 3030, Australia

[22] Filed: Oct. 24, 1974

[21] Appl. No.: 517,793

[52] U.S. Cl. ............................. 210/193; 210/386; 210/396; 210/400
[51] Int. Cl.² .................................... B01D 37/02
[58] Field of Search ...................... 47/1.4; 162/297; 209/47–49; 210/53, 67, 68, 73, 75, 77, 81, 152, 193, 386, 391, 396, 400

[56] References Cited
UNITED STATES PATENTS

| 813,890 | 2/1906 | Herr | 209/47 X |
|---|---|---|---|
| 2,525,135 | 10/1950 | Huff | 210/396 X |
| 2,653,521 | 9/1953 | Ahlfors | 210/393 X |
| 2,963,160 | 12/1960 | Wennberg | 210/193 |
| 3,038,789 | 6/1962 | Bennett et al. | 210/386 X |
| 3,254,768 | 6/1966 | Shimizu | 210/193 |
| 3,431,200 | 3/1969 | Davis et al. | 47/1.4 X |

Primary Examiner—Charles N. Hart
Assistant Examiner—Robert H. Spitzer
Attorney, Agent, or Firm—Lothrop & West

[57] ABSTRACT

From a water medium, a harvester recovers algae useful as animal feed. The harvester has a preferably endless, movable belt screen. A coating device puts a first coating of long fibers (such as glass fiber or asbestos mixed with paper fiber) onto one side of the belt screen. A container of algae in water discharges onto the first coating permitting much of the water to pass through it and the belt screen but holding back the algae largely as a second coating on the fibers. A second screen having finer openings than the first screen is disposed against the second coating. This second screen has openings large enough to pass the algae but small enough to hold back the fibers. A suction is applied to the second screen causing the algae and entrained water to move therethrough. Concurrently, a washer directs a stream through the first screen and through the first coating and so washes off the second coating of algae, the fine screen holding the fibers behind. A conduit carries the washed off algae from the second coating with some residual water into a centrifuge or other dryer for removing as much water as desired and leaving substantially pure algae for animal feed. Another washer removes the fibers from the screen. A second conduit carries the removed fibers back to the belt screen for reuse. The process of using the harvester is also disclosed.

13 Claims, 4 Drawing Figures

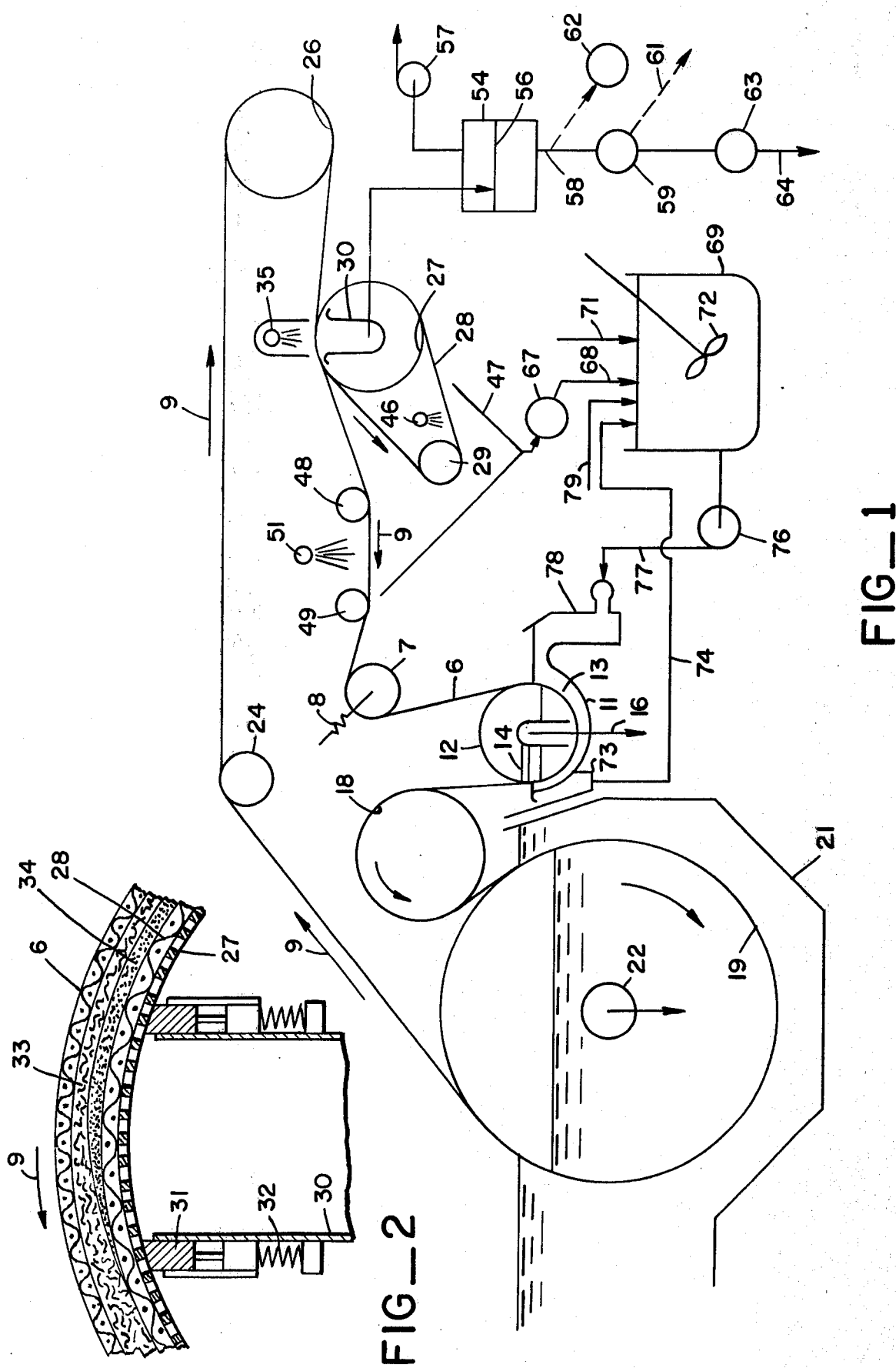

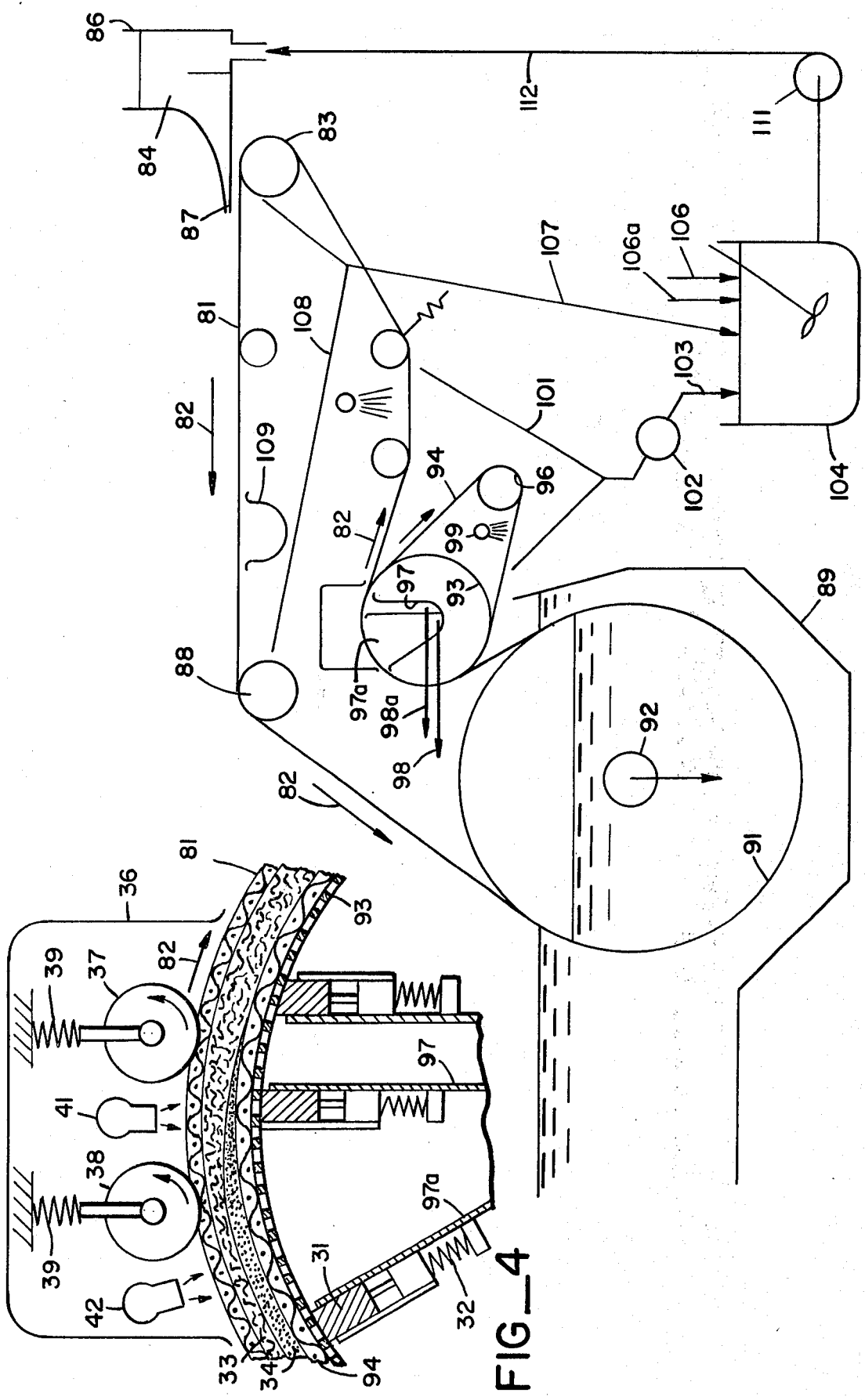

ALGAE HARVESTER

Related work is disclosed in my patent application entitled "Device And Method Of Recovering Sticky Particulate Materials Such As Algae" filed Mar. 1, 1972 with Ser. No. 230,697, now U.S. Pat. No. 3,836,681 dated Sept. 17, 1974. In the related case there is provided a method and means for handling sticky particulates such as algae (for example, Scenedesmus) in a fashion to separate the relatively sticky algae from some accompanying materials, if desired, but also, in many instances, to leave the sticky material and some selected accompanying material together. The selected accompanying material is often fibers, or the like, of wood pulp, such as is utilized in making paper. The ultimate aim is primarily to remove the algae and the fibrous material as an entity from the machine and to utilize the removed materials as an entity for cattle feed. This arrangement has proved successful in connection with ruminants, but it has developed that in many parts of the world algae and like materials available from the process and machine are especially desired for feed in connection with non-ruminant animals, for example, poultry. The physiological requirements of poultry are different from those of ruminants, particularly in that fibrous material, such as wood fiber, is not readily usable as feed. A variation in the process and machine is consequently required.

It has also developed in the culture of the algae or comparable organisms, utilized as a constituent of the animal feed, that the individual cells cultivated during warm weather or summer months are relatively large and can easily be handled together with paper fibers as a fibrous adjunct. But culture during the winter or cool season tends to provide algae of the same character but of a much smaller individual size. Many individuals are as small as three microns or thereabouts. The customarily available paper fibers are many times this size. They do not serve well as an aid in separating the small algal cells from accompanying liquid.

It is therefore an object of the invention to provide ways of utilizing a concomitant material to recover algae from liquid for use as feed, particularly as a high protein feed supplement for non-ruminants.

Another object of the invention is to provide a way for effectively separating algae from the normally accompanying liquid by use of a concomitant material, even though the individual algae are relatively small in size.

Another object of the invention is in general to provide a way of using fibrous or like materials in separating relatively sticky particles from a normally accompanying aqueous medium so as to provide such sticky particles, for example algae, as a feed or feed supplement for various kinds of animals.

A further object of the invention is to provide a way of improving generally the machine and process disclosed in the above-mentioned patent.

A further object of the invention is to provide an improved machine and technique for segregating algae from accompanying material such as fibers, water and the like.

A further object of the invention is to provide an improved process of harvesting algae, particularly for animal feed, from a water medium.

Other objects, together with the foregoing, are attained in the embodiments of the invention described in the accompanying description and illustrated in the accompanying drawings, in which:

FIG. 1 is a diagram showing schematically a flow chart and appropriate mechanism for accomplishing the purposes of the disclosure;

FIG. 2 is a fragmentary view in cross-section through a portion of the separating mechanism;

FIG. 3 is a view comparable to FIG. 1 but showing a different version of the flow chart and related structure; and FIG. 4 is a fragmentary view showing in cross-section a portion of a different separating structure.

While the algae harvester pursuant to the invention can be embodied in a number of different ways, it has in one instance been successfully embodied particularly as shown in FIG. 1. In this arrangement there is provided a main belt 6 of foraminous material preferably of a suitable mesh for retaining or supporting a fibrous precoat, but for permitting water and similar liquids to pass through. The main belt screen 6 is trained over a number of rotary drums and guides, later individually pointed out, and is effective to run on such supporting and guiding members in a closed circuit without the use of side chains or side supports as referred to in the above-identified patent.

In the present instance the belt screen 6 can be first considered as it leaves or descends from an idler drum 7 supported on a general framework (not shown) of the mechanism. The drum 7 is positioned under the tension of springs 8 so that there is good contact of the belt screen against its various supports and guides throughout the entire circuit. The belt screen 6 travels in the general direction of the arrows 9, thus descending from the drum 7 and entering into a vat 11 included in structure closely related to a forming drum 12.

The drum 12 is of perforate or foraminous material and at least in part is disposed in the vat 11 so that there is a converging or narrowing channel 13 between the wall of the vat 11 and the surface of the drum 12. The vat 11 is furnished, as later will appear, with a water supply carrying an appropriate precoating material for the belt screen 6. Whereas in the above-noted patent such precoat is primarily a paper fiber-like material, in the present instance and since such material may be entirely too coarse for present purposes, the precoat material is a much finer fiber. An example is glass fiber or, for example, asbestos fiber, alone or in combination with fine paper fiber. Diatomaceous earth has been considered for this use, but is not suitable since diatomaceous earth particles are approximately of the same size or diameter as the algae to be removed. There is not a good way, after diatomaceous earth and algae have once been mixed, to separate them again. Thus, the fibers utilized in the present instance are relatively long. They consequently have at least one dimension much greater than that of the algal cells, although their diameter may be of the order of that of the algal cells. The dimensional disparity assures that an excellent separation can ultimately be made.

As the belt screen 6 travels clockwise around the rotating forming drum 12 and passes through the aqueous bath in the vat 11, the fibrous material is deposited on the outer surface of the belt screen and forms in effect a precoat layer or blanket thereon. The water discharges through an outlet line 16 at the end center of the drum by siphon action or by connection to a low pressure source. Just as the belt screen 6 leaves contact with the drum 12, the belt screen passes over a suction tube 14 within the drum 12. The precoat thus is subjected to a draining and compacting action through the belt screen and through the perforate drum wall by reason of the vacuum. A good deal of water is withdrawn from the deposited fibrous material which remains on the belt screen.

The belt screen 6 then rises tangentially from the face of the drum 12 carrying its fiber coat or fibrous layer. The belt screen 6 then travels over an idler drum 18 rotating in a counterclockwise direction. Travel over the drum tends to unify and to compact slightly the fibrous coating on the belt screen 6. From the idler drum 18 the belt screen descends and advances clockwise in contact with the outer surface of a large filtering drum 19 of foraminous nature and rotating within the confines of a tank 21. The tank is open at one end, for example, to a supply of water containing harvestable algae. The material in the tank 21 is an aqueous source of algal cells supplied from the pond in which the algae are cultured. The drum 19 is internally connected by a pipe 22 to a drain mechanism providing a lower water level inside the drum creating a differential head through the drum submerged periphery. There is a radially inward flow of water and contained algae, the latter depositing on and in the fiber layer. The continuing or separated water in flowing through the pipe 22 is removed from the interior of the drum 19. This water normally is discharged as treated effluent or filtrate.

As the filtering drum 19 revolves in contact with the belt screen 6, there is an effective separation and concentration of algae. The water passes to the interior quite readily through the precoat, the belt screen and the drum wall but the algae do not. The cells are arrested by and deposited on and entrapped in the precoat material on the belt screen and thus are immobilized in or with respect to the precoat material.

The belt screen 6 leaves the periphery of the drum 19 at the point above the water level in the tank 21 and emerges with a coating not only of the precoat fibrous material next to it but also with a coating of the just-acquired algae largely on top of the precoat. This bi-layered or composite material travels upwardly with the belt screen on an incline. Any surplus water drains and falls by gravity and so returns to the tank 21. The moisture-reduced product on the belt screen at the upper end of the incline passes over an idler drum 24 and into a generally horizontal path. The belt screen then travels around another idler drum 26.

The materials in leaving the bottom of the idler drum 26 are on the exposed underside of the belt screen 6. Adjacent the discharge from the idler drum 26 there is provided a separating drum 27 of a foraminous nature rotating about an axis and overwrapped by a short separating belt screen 28. The belt screen 28 has a mesh or openness preferably even smaller than the mesh of the main belt screen 6 and much smaller than the openings in the separating drum 27. The openings in the drum 27 will pass both fibers and algae while the openings in the belt screen 28 will pass algae but not fibers. The arrangement is such that the main belt screen 6 in the vicinity of the drum 27 travels over the drum 27 but not in immediate contact therewith because the short belt screen 28 is interposed therebetween. The belt 28 is trained and travels around an idler drum 29 and cycles repeatedly around the drum 27 at the same travel speed so as to be in synchronism with the main belt screen 6. Within the drum 27 there is provided a dewatering structure including a vacuum chamber 30 having a construction substantially as shown in FIG. 2. At a convenient high point the chamber 30 is brought virtually into contact with the interior of the foraminous drum 27 by sealing blocks 31. These blocks are preferably urged into position by springs 32 so that a relatively tight fit is made between the drum and the chamber 30.

In the attitude in which the main belt screen 6 travels around the drum 27 (see FIG. 2) the immediate neighbor is a layer 33 of fibrous precoat, perhaps with some algae, while the next adjacent layer is a layer 34 largely of algae. The next layer is the short belt screen 28 and the innermost layer is the perforate wall of the drum 27. The chamber 30 within the drum 27 is preferably connected to a source of vacuum so that as the loaded belt screen 6 travels over the drum 27 the algae and water travel through the fine screen 28 whereas the large fibers remain behind. The algae and some water thus pass into the interior of the chamber 30 along with wash fluid, for example water or steam, descending from spray nozzles 35 above to augment algal discharge.

It is sometimes desired to replace or to augment the vacuum chamber 30 by a squeezing and washing arrangement. As particularly shown in FIG. 4, the parts generally are as previously described except that in contact with the outermost portion of a belt screen 81, similar to belt screen 6, and within an appropriate housing 36, there are provided one or more pressure units. As an example, there are duplicate rollers 37 and 38, each of which is connected to the frame through a spring mechanism 39 so that the roller contacts and presses downwardly upon the main belt screen 81. This does two things. It not only flexes and works the belt screen and the materials on the belt screen, particularly the fibers and algae thereon causing the algae to be more readily dislodged, but likewise tends to press the entrained water and algal material on the belt screen 81 radially inwardly toward a chamber 97a, similar to chamber 30, for removal. A dual chamber as shown in FIG. 4 may be used instead of a single chamber 30. There is a low vacuum chamber 97a, to accomplish initial separation, followed by a high vacuum chamber 97, which in combination with pressing by the roller 37 located over the chamber 97, removes most of the remaining entrained water and algae.

Adjacent the rollers 37 and 38 are spray nozzles 41 and 42 effective to discharge various jets of water against and through the belt screen 81 to tend to dislodge and wash the sticky algal particles through a belt screen 94, similar to belt screen 28. While any number of rollers and spray nozzles can be utilized, it has been found practically that a pair of each, substantially as shown in FIG. 4, is adequately effective. Virtually all of the algae are dislodged from the main belt screen 81 as the belt screen 81 traverses the housing 36 and the drum 93.

In some cases the amount of water coming from the sprays 41 and 42 is economically excessive, particularly in that it dilutes the separated algal slurry making later dewatering and drying more costly. If so, a substitution can be made by utilizing steam instead of water in the nozzles 41 and 42. This affords the benefit not only of utilizing a smaller quantity in order to effect equal discharge of algae and fibers but likewise has some sterilizing effect and also tends to soften the walls of the algae to improve the digestibility of the algae as feed. When steam is used there is condensate which enters the chambers 97a and 97. The term "water" is intended to apply both to steam condensate and to liquid water from the nozzles 41 and 42 as well as any other process water, for example entrained water, that accompanies the fibers and the algae.

Returning to FIG. 1, any particles of algal or fibrous material adhered to or lodged within the meshes of the belt screen 28 after that belt screen rounds the idler drum 29 come immediately under a water spray nozzle 46 discharging through the belt screen 28. This washes any adhering materials therefrom into a collecting trough 47.

Somewhat similarly, after leaving the drum 27 the main belt screen 6 travels under a pair of spaced idler drums 48 and 49 between which and above the belt screen is disposed a spray nozzle 51 discharging water onto the inside of the belt screen and washing precoat fiber particles carried thereby, and any algae trapped therein, into the same trough 47. By the time it leaves the idler drum 49, the main belt screen 6 is clean and available for further circuiting and so is carried around the idler drum 7, as initially described, and advanced for a new precoat within the vat 11 as before.

The chamber 30 contains practically all of the water and sticky algae removed from the main belt 6. The algal material is carried with accompanying water from the chamber 30 into a receiver chamber 54 and establishes a fluid level 56 therein. The chamber 54 is generally closed and the upper portion thereof is connected to a vacuum pump 57. Vacuum is communicated to the chamber 30, as described, any excess air in the system being discharged from the vacuum pump 57. The remaining liquid and algae, and any trace of fiber escaping through belt screen 28, are disposed in the lower portion of the receiver chamber 54 and travel therefrom in a conduit 58 that can be provided with various different instrumentalities.

Since the materials within the chamber 54 are primarily water and algae, the discharge in the conduit 58 can be taken into a centrifuge 59 effective to separate the algae from the water and discharge the algae through a line 61 for use either as a relatively moist mass or for subsequent final drying. A moist mass is often utilized in connection with feeding poultry for the somewhat wet mass can be mixed with additional feed into a paste. This is feasible provided that the material is utilized relatively soon before spoilage can take place. If it is likely that the material must be transported for a long distance or is to be kept or stored for a long time, then the moist form yields to a relatively dry form.

In the latter instance, instead of going to the centrifuge 59, the material in the conduit 58 is diverted into a spray dryer 62. This removes much of the accompanying water and leaves the algae and any trace of entrained fibers in condition for protracted storage or for long distance transport. The dry product serves as an appropriate high protein feed supplement, particularly for poultry or swine. It can also be utilized as a feed supplement for ruminant animals, although this is not as attractive economically because of alternate low cost sources of non-protein nitrogen such as urea than can be used with ruminants.

As an alternative to spray drying as accomplished in the dryer 62, the material in the conduit 58, perhaps after some treatment in the centrifuge 59 to remove a large part of the water, is transported by the conduit 58 into a drum dryer 63. Any remaining, unnecessary water is therein removed. The final algal product is discharged through a conduit 64 in relatively dry, stable condition.

The trough 47 contains the fibrous material washed off of the belt screen 6 and the belt screen 28 and some residual algae and contains a good deal of wash water from the spray 46 and from the spray 51. Means are provided for treating this material.

Discharge from the trough 47 is into a separator 67 preferably of an agitation and gravity separation type. The water and fibers and residual algae are shaken or agitated. The fibers settle by gravity more readily than the algae, leaving the algae suspended in the water. The excess water and most of the residual algae can be drained off for discharge or re-use, leaving nearly clean fiber. Alternatively, a centrifugal screen may be used for cleaning the fiber. The remaining fibrous slurry travels from the separator 67 through a conduit 68 into a mixer vat 69. Introduced through a conduit 71 into the vat 69 is a new or make-up fiber supply. This replaces fiber lost from the system in the various washing and separation operations. It may also include new make-up fiber to replace a small fraction of used fiber which may be intentionally wasted from the fiber collected in the trough 47, to prevent gradual buildup of fines or residual algae, or gradual change in fiber or precoat characteristics with continued reuse. The materials in the mixer vat 69 are made generally homogeneous in an aqueous medium and are churned or stirred by means of a mechanical impeller 72, appropriately driven.

To mix with these materials in the vat 69 is a quantity of liquid, primarily water and fiber, received by a trough 73 catching the overflow of the vat 11 surrounding the drum 12. This material is carried through a conduit 74 and discharges into the mixing vat 69. Also introduced into vat 69 is a supply of make-up water carried in through a conduit 79. This is used to control the consistency of the stock in vat 69 to the desired value for later precoat formation on the drum 12. Outflow from the mixing vat 69 carries water, fiber and some algae through a force pump 76 leading into an input tube 77 of a tank 78 forming part of the vat 11. The stock in the vat 11 is maintained at a convenient height to be picked up on the main belt screen 6, as previously described.

In a somewhat simplified version having many points in common with the version just described in connection with FIGS. 1, 2 and 4, there is provided, as especially shown in FIG. 3, an arrangement in which the main belt screen 81 similar to the belt screen 6 travels in the direction of the arrow 82. Upon rounding an idler pulley 83, the belt screen 81 passes under a precoating mechanism 84 similar to a Fourdrinier paper machine headbox. This is primarily a tank 86 containing an aqueous medium and a fibrous material for deposit upon the belt screen to serve as a precoat. The fibrous material is such as the previously-identified asbestos or fine glass fibers or the like, alone or in combination with paper fibers, and emerges through a relatively narrow aperture 87 of controlled size to deposit in a generally uniform and even layer across the entire width, or substantially so, of the belt screen 81. The coated belt screen then rounds another idler drum 88 and travels into a tank 89 similar to the tank 21 and in communication with a source of algae in water. Such algal material is present within the tank 89 and substantially entirely surrounds the lower portion of a filtering drum 91 having a peripheral wall of a foraminous material.

The interior of the drum 91 is connected to an outflow duct 92 so that the level within the drum is somewhat less than that outside the drum creating a differential head through the drum submerged periphery. There is a consequent, radially inward flow of the contents of the tank 89 onto the precoat layer on the belt screen 81. This affords a generally uniformly thick deposit of algae upon and partially into the precoat fiber layer. The doubly coated belt screen 81 emerges from the tank 89 and follows around a separating drum 93 comparable to the drum 27.

The drum 93 is overwrapped by a short separating belt screen 94 similar to the belt screen 28 which travels in a circuit around an idler drum 96. The belt screen 94 is interposed between the foraminous or perforate drum surface 93 and the belt screen 81. The relative sizes of the openings in the main belt screen 81, in the separating belt screen 94 and in the drum 93 are as previously described for the belt screen 6, the belt screen 28, and the drum 27, respectively. The relatively small algae are readily able to pass from their location approximately on the surface of the fibrous precoat on the belt screen 81 into the interior of the drum 93 but the fibers cannot do so. The algae are pulled into the drum 93 or are forced into that drum or both by mechanism of the sort illustrated in FIGS. 2 and 4 or either or both of them.

By this means the algae themselves are readily separated from the adjacent fibrous precoat and flow with some accompanying water into the chambers 97 and 97a comparable to the chamber 30. The algae and liquid are then taken through outflow conduits 98 and 98a for final separation as previously described for the conduit 58 (FIG. 1). The fibers which have been separated from most of the algae at this point are carried along the upper run of the belt 94 and around the idler drum 96 and are discharged from the lower run of belt 94 by fluid flow from a nozzle 99. Water emerges from the nozzle to force the filtering fibers and any residual algae down into a hopper 101.

The hopper 101 discharges into a separator 102 as previously described for the separator 67. The fibers continue their travel through a conduit 103 into a mixing vat 104, whereas most of the accompanying water and algae are separately discharged. In the mixing vat 104 the entering fibers are added to by make-up fibers conducted through a conduit 106 as previously described for the conduit 71. There is also some return water and a small amount of fiber received through a conduit 107 from a trough 108 underlying the top run of the belt screen 81. The trough 108 gathers whatever excess water passes from the fiber layer just laid down on the belt screen 81. Likewise, the trough 108 receives water from an extractor 109 subjecting one portion of the belt screen 81 to a vacuum which removes all but a desired part of the water from the fibers thereon. The extracted water is added to the mixing vat 104. Make-up water is also introduced into vat 104 through a conduit 106a as previously described for the conduit 79. Outflow from the mixing vat 104 carries water, fiber and a minimal amount of residual algae via a stock feed pump 111 through a conduit 112 to the precoating mechanism 84. In this way the major fraction of the fibrous precoat is continuously recirculated in the system, any deficiency being made up through the conduit 106. The amount of algae which is recirculated is very small — not enough to impair the filtering capacity of the drum 91.

In each form of the invention there is provided a mechanism for separating the algae from most of the culture liquid in which it has grown by use of a fibrous material that is not discharged from the mechanism for use as feed but rather is retained, is well separated from the algae and is recirculated repeatedly for substantially continuous use.

What is claimed is:

1. An algae harvester comprising a main belt screen, means for supporting and advancing said main belt screen along a predetermined path through successive stations, means at a first station for supplying long fibers in a water carrier to one side of said main belt screen and for removing much of said fiber water carrier through said main belt screen leaving said long fibers on said one side thereof, means at a second station for supplying said one side of said main belt screen and said long fibers thereon with algae in a water carrier, a fine belt screen at a third station having a mesh too small to pass said long fibers, means supporting and advancing said fine belt screen adjacent to, in face-to-face relation with and in synchronism with a portion of said main belt screen and in substantial contact with said algae thereon, and means at said third station for causing flow of much of said algae water carrier and said algae through said fine belt screen.

2. An algae harvester as in claim 1 including a main perforate drum at said second station engaging said main belt screen, and means for at least partially immersing said main perforate drum and said main belt screen engaged therewith in said water carrier containing algae.

3. An algae harvester as in claim 2 including means for drawing said water carrier and said algae to said main belt screen and at least some of said water carrier through said main belt screen and into the interior of said main perforate drum.

4. An algae harvester as in claim 1 including a second perforate drum at said first station engaging said main belt screen, and means for at least partially immersing said second perforate drum and said main belt screen engaged therewith in said water carrier containing long fibers.

5. An algae harvester as in claim 4 including means for drawing said water carrier and said long fibers to said main belt screen and at least some of said water carrier through said main belt screen and into the interior of said second perforate drum.

6. An algae harvester comprising means for confining a water body containing algae, a main perforate drum, means positioning said main perforate drum in said confining means, a guide drum, a main belt screen trained around said main perforate drum and around said guide drum to advance thereover in a predetermined direction, means for depositing fibers on said main belt screen in advance of the engagement of said main belt screen with said main perforate drum and on a side of said main belt screen away from said main perforate drum, means for depositing algae from said water body on said fibers, a fine belt screen having a mesh too small to pass said fibers, means superimposing said fine belt screen in generally face-to-face relation to said main belt screen and against fibers and algae on a section of said main belt screen following travel of said main belt screen around said main perforate drum and in said water body, means for causing said algae and entrained water from said fibers to pass through said fine belt screen, means for receiving said entrained water and algae contained therein, from said fine belt screen, means for removing said algae from said entrained water, means for washing said fibers from said main belt screen in a location away from said fine belt screen, means for receiving said fibers washed from said main belt screen, and means for transferring fibers from said receiving means to said depositing means.

7. An algae harvester as in claim 6 including means for adding make-up fibers to said receiving means.

8. An algae harvester as in claim 6 including means for washing said fine belt screen after said algae and entrained water have been separated therefrom and said fine belt screen is away from said main belt screen by a wash stream directed from the inside of said fine belt screen outwardly, and means for directing said wash stream from said fine belt screen to said receiving means.

9. An algae harvester as in claim 6 in which said separating means includes a suction device.

10. An algae harvester as in claim 9 in which said suction device includes a low suction region and a high suction region positioned in succession along said fine belt screen.

11. An algae harvester as in claim 6 in which said belt screens and materials thereon travel against and in pressure contact with at least one pressure roller.

12. An algae harvester as in claim 6 in which said separating means includes a washing device.

13. An algae harvester as in claim 6 in which said separating device includes a low suction device, a high suction device, a washing device and at least one pressure device all arranged to operate substantially simultaneously on adjacent portions of said main belt screen and said fine belt screen.

* * * * *